United States Patent
Lewis et al.

[11] 3,899,510
[45] Aug. 12, 1975

[54] CYCLOALKYLAMINO COMPOUNDS

[75] Inventors: John William Lewis, North Ferriby; Michael John Readhead, North Hull, both of England

[73] Assignee: Reckitt & Colman Products Limited, Hull, England

[22] Filed: June 4, 1973

[21] Appl. No.: 366,609

[30] Foreign Application Priority Data
June 7, 1972 United Kingdom............... 26602/72

[52] U.S. Cl. .......................... 260/326.5 M; 424/274
[51] Int. Cl.² ......................................... C07D 27/00
[58] Field of Search ............. 424/274; 260/326.5 M

[56] References Cited
UNITED STATES PATENTS
3,634,454  1/1972  Lewis et al. ................. 260/326.5 M Primary Examiner—Elbert L. Roberts
Attorney, Agent, or Firm—Bacon & Thomas

[57] ABSTRACT

Compounds of the formula:

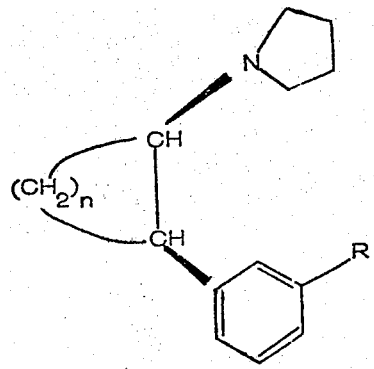

I where $n$ is an integer selected from 3, 4 and 5 and R represents certain specified substituent groups. The compounds are inhibitors of acetylcholinesterase. Pharmaceutical compositions comprise a compound of Formula I and a pharmaceutically acceptable diluent or carrier.

9 Claims, No Drawings

CYCLOALKYLAMINO COMPOUNDS

BACKGROUND OF THE INVENTION

This invention relates to novel cycloalkylamino compounds, to processes for their preparation and to pharmaceutical formulations containing such compounds. The compounds of the invention are inhibitors of acetylcholinesterase.

PRIOR ART

British patent specification No. 1,207,731 relates to compounds of the formula:

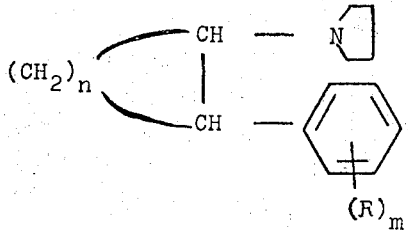

wherein $n$ is an integer of from 3 to 5, $m$ is 0 or an integer of 1 or 2, R is methyl or methoxy and pharmaceutically acceptable salts of the compounds of the said formula. The compounds are stated to have a depressant action on the central nervous system.

British patent application No. 1084440 relates to novel (2-aminocycloalkyl) hydroquinones having in their free base form the general formula:

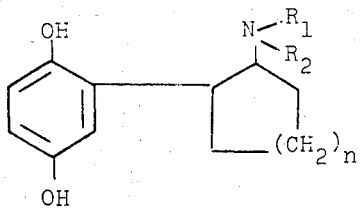

wherein $n$, $R_1$ and $R_2$ represent certain specified substituent groups. The compounds are stated to be pharmacologically active as inhibitors of pseudocholinesterase, and they are stated to be of use as central nervous system stimulants in mammals, birds and other animals. Particularly the compounds are stated to be of use for the alleviation of mental depression.

There is no reference in either of these specifications to the possibility of any of the compounds disclosed therein possessing the property of inhibiting acetylcholinesterase.

SUMMARY OF THE INVENTION

The present invention provides compounds of the formula:

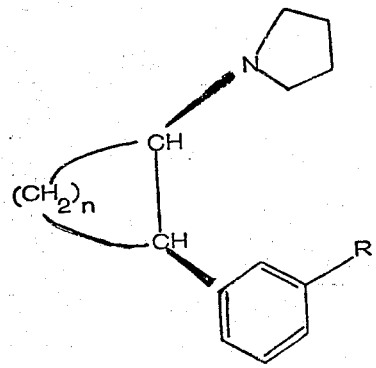

wherein $n$ is an integer from 3 to 5 inclusive, R is selected from the group consisting of hydroxy, amino, dimethylamino and $OR^1$ wherein $R^1$ is selected from the group consisting of acetyl, propionyl, butyryl, carbamoyl, methylcarbamoyl and dimethylcarbamoyl; and pharmaceutically acceptable salts thereof.

It will be appreciated that the compounds of Formula I are cis-2-phenyl-pyrrolidinocyclohexanes.

DESCRIPTION OF PREFERRED EMBODIMENTS

In a preferred aspect of the invention there are provided compounds of Formula I in which $n$ is an integer 3 or 4 and R is a hydroxy group.

The invention also provides therapeutic compositions comprising a compound of Formula I, or a pharmaceutically acceptable salt thereof together with a pharmaceutically acceptable diluent or carrier.

As mentioned previously the compounds of the invention are potent inhibitors of acetylcholinesterase and may be expected to be of use in clinical situations which are attributable to an effective lack of the neurotransmitter acetylcholine.

The compounds of Formula I in which R is a hydroxy group may be prepared from the corresponding methyl ethers in which R is a methoxy group, by treatment with reagents commonly employed for the cleavage of ethers, such as hydrobromic acid and boron tribromide. The said methyl ethers may be prepared by the reaction of a ketone of the formula:

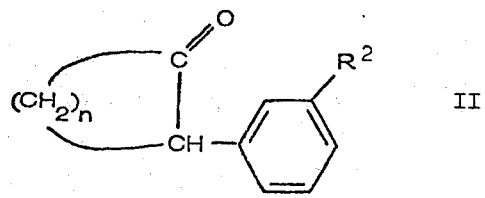

wherein $n$ is an integer of 3 to 5 and $R^2$ is a methoxy group with pyrrolidine in the presence of formic acid.

The compounds of Formula I in which R is $OR^1$, wherein $R^1$ is as hereinbefore defined, are prepared from the compounds of formula I in which R is a hydroxy group by treatment with an acid chloride $R^1Cl$.

The compounds of Formula I in which R is a dimethylamino group, may be prepared by the reaction of a ketone of the formula:

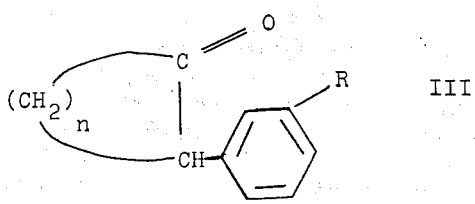

wherein $n$ is an integer of 3 to 5, R is a dimethylamino group, with pyrrolidine in the presence of formic acid, The compounds of Formula I in which R is an amino group may be prepared from the compounds of Formula I in which R is a hydroxy group by reaction with diethyl phosphorochloridate to afford a diethyl phosphate ester which is converted to a primary amine by reaction with potassamide and potassium in liquid ammonia.

The invention is further illustrated by the following non-limiting examples.

EXAMPLE 1 cis-2-(3-Hydroxyphenyl)-1-pyrrolidinocyclohexane a. 2-(3-Methoxyphenyl)cyclohexanone (30g), pyrrolidine (20g) and 98–100% formic acid (20g) were heated under reflux at 130° to 140°C for 18 hours. The cooled mixture was poured into dilute hydrochloric acid, washed with ether, basified and ether extracted. The dried extract was evaporated to give cis-2-(3-methoxyphenyl)-1-pyrrolidinocyclohexane (19g) as colourless oil. A sample distilled at 150° to 154°C/1 mm gave a hydrochloride m.p. 145° to 147°C.

Analysis Found: C,68.7; H,8.8; N,4.7; Cl,12.4
$C_{17}H_{25}NO$. HCl requires: C,68.8; H,8.7; N,4.7; Cl,11.9%.

b. (1) The above oil (19g) was boiled in 47% hydrobromic acid (60 ml) for 6 hours. The cooled solution was diluted with water, washed with ether, basified and ether extracted. The dried extract was evaporated. The residue was triturated with petroleum ether (b.p. 40° to 60°C) and crystallised from petroleum ether (b.p. 60° to 80°C)/ ethyl acetate to give cis-2-(3-hydroxyphenyl)-1-pyrrolidinocyclohexane (12g), m.p. 124° to 126°C.

Analysis Found: C,77.7; H,9.6; N,5.5 $C_{16}H_{23}NO$ requires: C,78.2; H,9.5; N,5.7% b. (2) A solution of cis-2-(3-methoxyphenyl)-1-pyrrolidinocyclohexane (2.5g) in dichloromethane was added cautiously to an ice-cold solution of boron tribromide (3 ml) in dichloromethane (15ml). The mixture was set aside at room temperature for 18 hours and was hydrolysed with water. The aqueous layer was collected, made alkaline with ammonia and extracted with ether. The ether extracts were washed, dried ($Na_2SO_4$) and evaporated. The residue was crystallised from aqueous ethanol to give cis-2-(3-hydroxyphenyl)-1-pyrrolidinocyclohexane (2.0g), m.p. 125° to 127°C, identical to (b) (1) above.

EXAMPLE 2 cis-2-(3-butyryloxphenyl)-1-pyrrolidinocyclohexane

Butyryl chloride (4g) was added cautiously at room temperature to a solution of cis-2-(3-hydroxyphenyl)-1-pyrrolidinocyclohexane (5g) and triethylamine (10 ml) in dichloromethane. After 48 hours at room temperature the mixture was washed with water, the organic layer was collected, dried ($Na_2SO_4$) and evaporated. The residue was chromatographed on an alumina column (neutral; grade 1) eluting with ethyl acetate/petroleum ether (b.p. 60° to 80°C) (1:4), evaporation of the solvent afforded the desired product as an oil (5.5g).

Analysis Found: C,75.4; H,9.3; N,4.4 $C_{20}H_{29}N_4O_2$ requires: C,76.1; H, 9.3; N,4.6%

A sample was characterised by treatment with iodomethane as the methiodide m.p. 166° to 167°C.

EXAMPLE 3 cis-2-(3-Dimethylcarbamoyloxyphenyl)-1-pyrrolidinocyclohexane cis-2-(3-Hydroxyphenyl)-1-pyrrolidinocyclohexane (6g), triethylamine (10g) and dimethyl carbamoyl chloride (5.3g) were heated in boiling xylene under reflux for 5 hours. The cooled mixture was poured into water and extracted into ether. The ether extracts were washed, dried ($Na_2SO_4$) and evaporated. The residue (7.9g) was chromatographed on an alumina column (400g; neutral, grade 1) eluting with ethyl acetate/petroleum ether (b.p. 60° to 80°C) (1:9), evaporation of the solvent afforded the desired product as an oil (5.0g).

Analysis Found: C,72.2; H,8.9; N,9.1 $C_{19}H_{28}N_2O_2$ requires: C,72.2; H,8.9; N,8.9%

A sample was characterised by treatment with iodomethane as the methiodide m.p. 184° to 186°C.

EXAMPLE 4 cis-2-(3-Hydroxyphenyl)-1-pyrrolidinocyclopentane

Prepared by the method of Example 1 with hydrolysis employing hydrobromic acid. m.p. 154° to 155°C.

Analysis Found: C,78.1; H,9.2; N,6.1 $C_{15}H_{21}NO$ requires C,77.9; H,9.2; N,6.1%

Screening for anticholinesterase activity was carried out in vitro by the Michel method (J. Lab. Clin. Med 34, 1564, (1949) using acetylcholine as substrate, washed human red cells as the source of acetylcholinesterase. Concentrations of drugs giving approximately 50% inhibition of enzyme activity are set out in Table I:

Table I

| No. of Example | Conc. giving approx. 50% inhibition of Acetylcholinesterase |
| --- | --- |
| 1 | $2 \times 10^{-7}$ M |
| 2 | $5 \times 10^{-7}$ M |
| 3 | $2 \times 10^{-7}$ M |
| 4 | $4 \times 10^{-7}$ M |
| Edrophonium | $5 \times 10^{-5}$ M |
| Neostigmine | $4 \times 10^{-7}$ M |

The figures for Edrophonium and Neostigmine are given for comparison purposes. The figures show that the compounds possess antiacetylcholinesterase properties comparable to neostigmine, a clinically established drug.

In Table II for purposes of comparison with cis 2-(3-hydroxyphenyl)-1-pyrrolidinocyclohexane are set out test data for the corresponding cis 2-hydroxy and 4-hydroxy isomers, the trans 3-hydroxy isomer, and the piperidino and morpholino cis 3-hydroxy analogues.

Table II

| | Conc. giving approx. 50% inhibition of Acetylcholinesteraset |
| --- | --- |
| cis 2-hydroxy | $4 \times 10^{-5}$ M |
| cis 4-hydroxy | $4 \times 10^{-5}$ M |
| trans 3-hydroxy | $10^{-4}$ M |
| cis 3-hydroxy piperidino | $4 \times 10^{-6}$ M |
| cis 3-hydroxy morpholino | $10^{-5}$ M |

From these results it can be seen that against acetylcholinesterase there is a peaking of activity with cis 2-(3-hydroxyphenyl)-1-pyrrolidinocyclohexane in that this compound produces the same level of inhibition as is obtained with a concentration some 500 × as great of the trans 3-hydroxy isomer, some 200 × that of the cis 2-hydroxy and cis 4-hydroxy isomers, some 50 × that of the cis 3-hydroxy morpholino and some 20 × that of the cis 3-hydroxy piperidino.

Compounds that are potent inhibitors of acetylcholinesterase may be expected to be of use in clinical situations where the pathological conditions are characterised by a lack of either skeletal or smooth muscle tone, e.g., myasthenia gravis, paralytic ileus, urinary retention and glaucoma. They may also be used in the reversal of muscle relaxation induced during surgery by non-depolarising skeletal muscle relaxants such as D-tubocurarine.

Myasthenia is a syndrome of increased fatiguability in striated muscle. The characteristic feature from which the disease derives its name is a severe weakness of voluntary muscles which begins after exercise but which may disappear after a short rest. Although the weakness may affect any muscle, the eyelids, extraocular muscles, bulbar muscles, neck and proximal muscles of the upper limbs are most commonly involved. The hand, lower limb and trunk muscles are usually involved later. It is now accepted that acetylcholine is the neurotransmitter at the neuromuscular junction. In myasthenia there appears to be a disturbance in the release of acetylcholine from the nerve ending resulting in impaired neuromuscular transmission. The symptoms which appear as a result of this defect may be treated by blocking acetylcholinesterase, the enzyme normally responsible for the metabolism of acetylcholine.

There is no accepted animal model for myasthenia gravis at present and prospective drugs are initially assessed for their antiacetylcholinesterase activity rather than anti-myasthenic activity. Anticholinesterase tests may be subdivided into in vitro and in vivo tests.

In vitro testing of compounds was carried out by the method of Ellmann Biochem. Pharmacol. 7, 88 (1961) with acetylthiocholine as substrate and bovine erythrocyte acetylcholinesterase as enzyme. Reaction rates were determined with and without inhibitors under competitive conditions (i.e., the substrate was added before the inhibitor). Results were plotted by the Lineweaver-Burk method and these plots were used to determine inhibitor constants (Ki values). The following are the results for the compound of Example 1 together with the comparative result for neostigmine.

| No. of Example | Ki |
| --- | --- |
| 1 | $1.3 \times 10^{-8}M$ |
| Neostigmine | $3.0 \times 10^{-8}M$ |
| Pyridostigmine | $4.8 \times 10^{-6}M$ |

A small Ki value represents high antiacetylcholinesterase activity and from the results it can be seen that the compound of Example 1 is comparable in potency to neostigmine.

In vivo testing was carried out employing the mouse miosis test of Schneider R, J. Pharm. 22, 298 (1970) in which antiacetylcholinesterases induce constriction of the pupil in the eye of the mouse, and the rat chromodacryorrhoea test of Burgen A.S.V. Brit. J. Pharmacol. 4; 185 (1949) in which antiacetylcholinesterases potentiate the ability of acetylcholine to provoke red tears in rats. Both tests enable the potency and duration of action of antiacetylcholinesterases to be assessed. The results are set out in the Table below which compares the potency and duration of action of various antiacetylcholinesterases, relative to neostigmine, a current drug of clinical choice.

| No. of Example | Potency Mouse Miosis Rat chromod. | | Duration of Action Mouse Miosis Rat chromod. | |
| --- | --- | --- | --- | --- |
| | SC | IP | SC | IP |
| 1 | 0.26 | 0.38 | 1.8 | 5.00 |
| Neostigmine | 1.0 | 1.0 | 1.00 | 1.00 |
| Edrophonium | 0.04 | 0.09 | 0.40 | 0.25 |
| Amberonium | 0.06 | 0.03 | — | 1.00 |
| Tacrine | 0.21 | 0.38 | — | 1.38 |

From these results it can be seen that cis-2-(3-hydroxyphenyl)-1-pyrrolidinocyclohexane (Example 1) is more potent than 3 commercial drugs but is less potent than neostigmine. However the compound has a longer duration of action which may offer advantage in the treatment of myasthenia. For this purpose the likely oral dose is 40 to 60 mg. It should be noted that as this compound is a tertiary amine it should be both regularly and completely absorbed after oral administration. This is in contrast to established antiacetylcholinesterases which are poorly and irregularly absorbed after oral dosage due to their quaternary nature. The nature of enzyme inhibition achieved after dosage with neostigmine or pyridostigmine is thought by some workers to account for sudden onset of weakness in myasthenic patients after a period of successful treatment. The weakness is thought to result from excessive depolarisation of the muscle end plate. The compound is more comparable in action with edrophonium (i.e. it is unable to form co-valent bands with the enzyme) and is thus unable to provoke similar relapses on prolonged treatment. This freedom from relapse should offer advantage to this compound.

The pharmaceutical compositions may be in a form suitable for oral administration and may take the form of capsules, tablets, granules or liquid preparations such as elixirs, syrups or suspensions.

For the purposes of convenience of accuracy of dosing the compositions are advantageously employed in a unit dosage form. For oral administration the unit dosage form contains from 20 mg to 100 mg, of the compound of said formula.

We claim:

1. Compounds of the general formula:

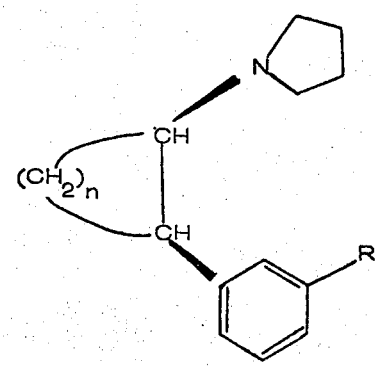

I wherein $n$ is an integer from 3 to 5 inclusive, R is selected from the group consisting of hydroxy, amino, dimethylamino and $OR^1$ wherein $R^1$ is selected from the group consisting of acetyl, propionyl, butyryl, carbamoyl, methylcarbamoyl and dimethylcarbamoyl; and pharmaceutically acceptable salts thereof.

2. A compound as claimed in claim 1 which is cis-2-(3-hydroxyphenyl)-1-pyrrolidinocyclohexane.

3. A compound as claimed in claim 1 which is cis-2-(3-butyryloxyphenyl)-1-pyrrolidinocyclohexane.

4. A compound as claimed in claim 1 which is cis-2-(3-dimethylcarbamoyloxyphenyl)-1-pyrrolidinocyclohexane.

5. A compound as claimed in claim 1 which is cis-2-(3-hydroxyphenyl)-1-pyrrolidinocyclopentane.

6. A process for the preparation of a compound of the formula I as claimed in claim 1 wherein R is a hydroxy group which process comprises reacting a compound of the formula:

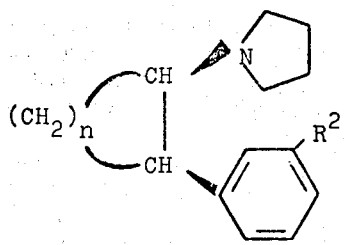

wherein $n$ is an integer of 3 to 5 and $R^2$ is a methoxy group, with hydrobromic acid or boron tribromide.

7. A process for the preparation of a compound of formula I as claimed in claim 1 wherein R is an amino group which process comprises reacting the corresponding compound of formula I wherein R is a hydroxy group with diethyl phosphorochloridate to form a diethyl phosphate ester which is converted to a primary amine by reaction with potassamide and potassium in liquid ammonia.

8. A process for the preparation of a compound of formula I as claimed in claim 1 wherein R is the group $OR^1$ in which $R^1$ is as hereinbefore defined, which process comprises treating the corresponding compound of formula I wherein R is a hydroxy group with an acid chloride of formula $R^1$ Cl.

9. A process for the preparation of a compound of formula I as claimed in claim 1 wherein R is a dimethylamino group which process comprises reacting a ketone of formula

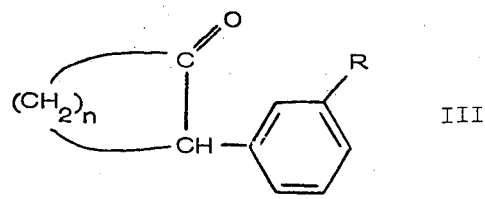

wherein $n$ is an integer of 3 to 5 and R is a dimethylamino group, with pyrrolidine in the presence of formic acid.

* * * * *